(12) United States Patent
Chung

(10) Patent No.: US 6,461,191 B1
(45) Date of Patent: Oct. 8, 2002

(54) WIRE RECEIVING DEVICE WITHOUT CONNECTION POINT

(76) Inventor: Yu Lin Chung, No 4, Lane 130, Nan-Kang Rd, Sec. 3, Taipei (TW)

( * ) Notice: Subject to any disclaimer, the term of this patent is extended or adjusted under 35 U.S.C. 154(b) by 0 days.

(21) Appl. No.: 09/835,695

(22) Filed: Apr. 10, 2001

(51) Int. Cl.$^7$ .......................... H01R 13/72; B65H 75/48
(52) U.S. Cl. ..................................... 439/501; 242/378.1
(58) Field of Search ................................. 439/501, 502, 439/4, 3, 15; 242/378.1, 378.2, 378.3

(56) References Cited

U.S. PATENT DOCUMENTS

| | | | | |
|---|---|---|---|---|
| 1,599,219 A | * | 9/1926 | Dowick | 191/12.2 R |
| 3,409,246 A | * | 11/1968 | De Pas | 242/378.2 |
| 3,853,285 A | * | 12/1974 | Woodring | 191/12.4 |
| 4,282,954 A | * | 8/1981 | Hill | 191/12.4 |
| 4,542,858 A | * | 9/1985 | Manges | 242/54 |
| 4,812,132 A | * | 3/1989 | Gunnarsson | 439/164 |
| 5,468,159 A | * | 11/1995 | Brodsky et al. | 439/501 |
| 5,700,150 A | * | 12/1997 | Morin | 439/4 |
| 5,701,981 A | * | 12/1997 | Marshall et al. | 191/12.4 |
| 5,797,558 A | * | 8/1998 | Peterson et al. | 242/373 |
| 5,841,069 A | * | 11/1998 | Nagaoka et al. | 174/69 |
| 5,975,931 A | * | 11/1999 | Ishikawa | 439/164 |
| 6,019,304 A | * | 2/2000 | Skowronski et al. | 242/373 |
| 6,056,591 A | * | 5/2000 | Liao | 439/501 |
| 6,250,578 B1 | * | 6/2001 | Manda | 191/12.2 R |
| 6,254,025 B1 | * | 7/2001 | Liao | 242/378.1 |
| 6,287,141 B1 | * | 9/2001 | Hsieh | 439/501 |
| 6,299,477 B1 | * | 10/2001 | Rohrbach et al. | 439/501 |
| 6,305,632 B1 | * | 10/2001 | Hwang | 242/372 |

\* cited by examiner

Primary Examiner—P. Austin Bradley
Assistant Examiner—Edwin A. León
(74) Attorney, Agent, or Firm—Pro-Techtor International Services

(57) ABSTRACT

The present invention provides a wire receiving device without any connection point including a housing, and a fixing shaft center mounted in the housing. A wire is fixed to the wire fixing end and is extended into the housing. The wire is then wound around the outer periphery of the fixing shaft center, thereby forming an inner circle of the wire. The wire is then wound around the mobile shaft center along a reverse direction, thereby forming an outer circle of the wire. The inner circle and the outer circle of the wire are wound in the reverse directions. Thus, a space is previously left when the wire is pulled outward, thereby reducing the volume of the housing, and saving the cost of fabrication. In addition, the wire receiving device has no any connection point.

1 Claim, 4 Drawing Sheets

WIRE RECEIVING DEVICE WITHOUT CONNECTION POINT

BACKGROUND OF THE INVENTION

1. Field of the Invention

The present invention relates to a wire receiving device without any connection point, and more particularly to a wire receiving device without any connection point, wherein the inner circle and the outer circle of the wire are in turn wound in the housing along the reverse directions in a coaxial manner, thereby reducing the volume of the housing, and saving the cost of fabrication.

2. Description of the Related Art

A power converter of a traditional electrical appliance includes a body having one end formed with a power plug that may be inserted into an ordinary receptacle for conducting the electric power. The output wire of the other end of the body is connected to an output plug which may be inserted into other electrical appliance, or into the insertion hole of a mobile telephone (or cellular phone), or into the power insertion hole of a notebook computer, for directly supplying the electric power or supplementing the electric power.

A conventional wire receiving device in accordance with the prior art can be used to receive and store the output wire of the power converter and comprises a winding spring for winding and drawing the output wire into the housing of the conventional wire receiving device. However, the output wire wound in the housing has a structure with a single direction only. Thus, the housing has to co-operate with the wound output wire, so that the volume of the housing cannot be reduced, thereby increasing the volume of the housing, and thereby increasing the cost of fabrication.

SUMMARY OF THE INVENTION

The present invention has arisen to mitigate and/or obviate the disadvantage of the conventional wire receiving device.

The primary objective of the present invention is to provide a wire receiving device without any connection point including a housing, and a fixing shaft center mounted in the housing. The housing is provided with an equipment that can wind the wound wire into the housing. After the wire is fixed to the wire fixing end of the housing, the wire is initially wound around the fixing shaft center, thereby forming an inner circle of the wire. The wire is then wound around the mobile shaft center along a reverse direction, thereby forming an outer circle of the wire. The inner circle and the outer circle of the wire are wound in the reverse directions. After the outer circle of the wire is filled with the housing, the wire is extended outward from the outlet of the housing and is connected to an output plug or a power plug.

Another objective of the present invention is to provide a wire receiving device without any connection point, wherein the inner circle and the outer circle of the wire are in turn wound in the housing along the reverse directions in a coaxial manner, thereby reducing the volume of the housing, and saving the cost of fabrication.

In accordance with the present invention, there is provided a wire receiving device without any connection point, comprising:

a housing, a fixing shaft center mounted in the housing, the fixed shaft center connected with a wire fixing end, a wire fixed to the wire fixing end and extended into the housing, the wire wound around the fixing shaft center along an outer periphery of the fixing shaft center, thereby forming an inner circle of the wire, the wire passed through a breach defined in one end of a coaxial mobile shaft center that covers and encompasses the inner circle of the wire, the wire wound around the mobile shaft center along a reverse direction to change a winding direction of the wire, thereby forming an outer circle of the wire, the wire extended outward from an outlet of the housing and connected to an output plug or a power plug, thereby being combined into a brushless wire receiving device having a small volume and having a low cost.

Further benefits and advantages of the present invention will become apparent after a careful reading of the detailed description with appropriate reference to the accompanying drawings.

DETAILED DESCRIPTION OF THE INVENTION

Figure 1:
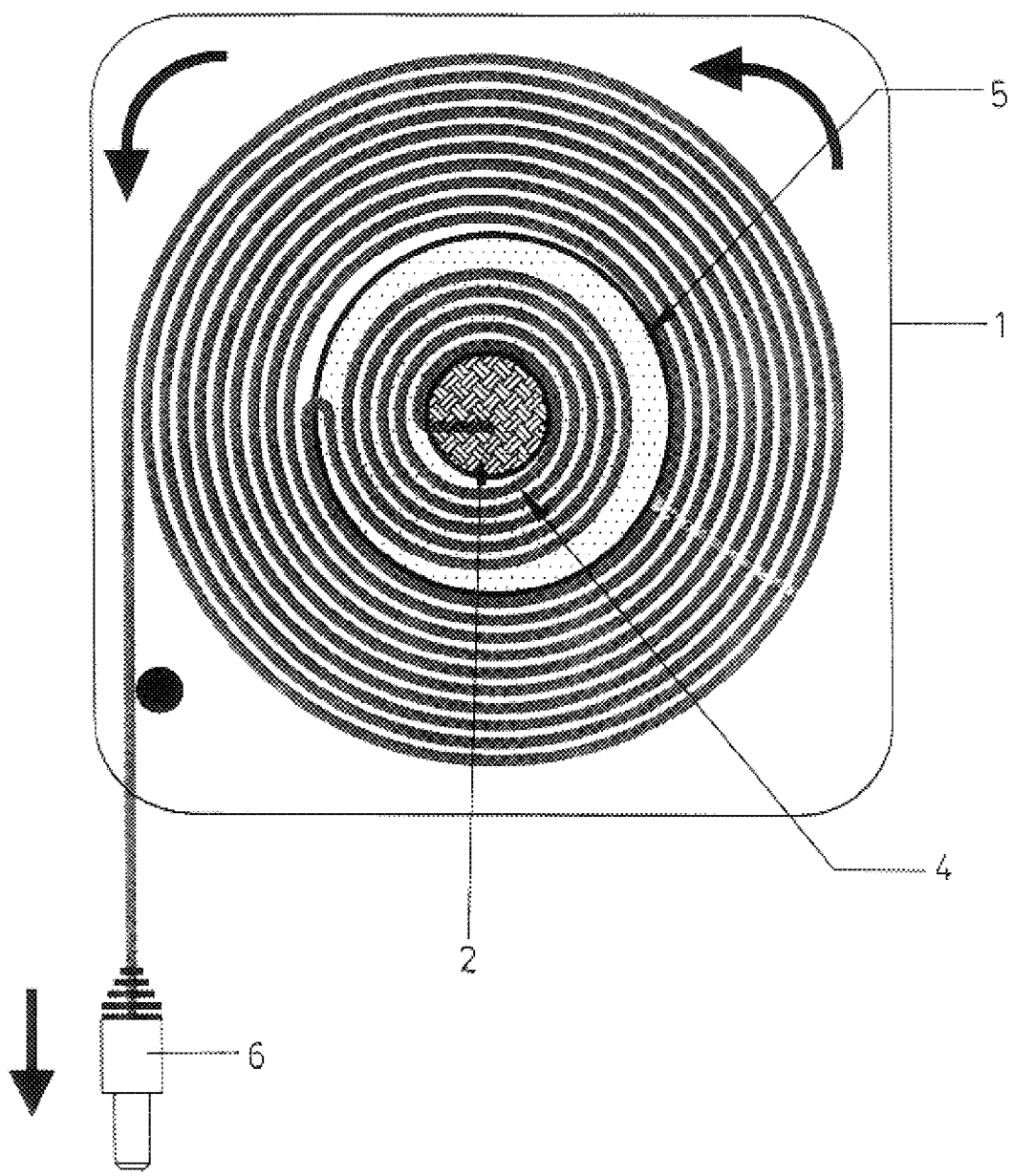
FIG. 1 is a schematic cross-sectional view of a wire receiving device without any connection point in accordance with the present invention, wherein the wire is stored in the housing.
Figure 2:
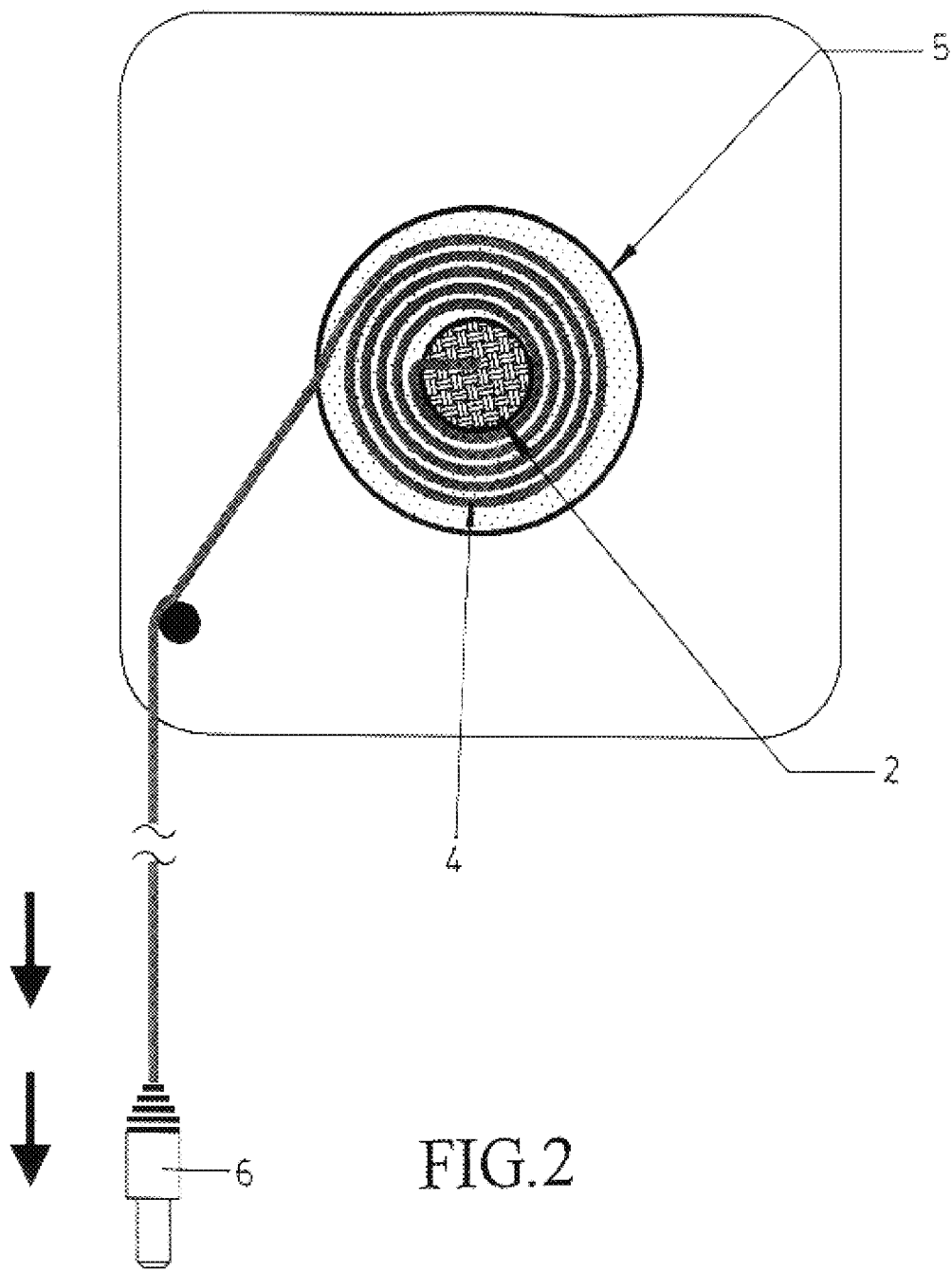
FIG. 2 is a schematic cross-sectional view of the wire receiving device without any connection point in accordance with the present invention, wherein the wire is pulled outward from the housing.
Figure 3:
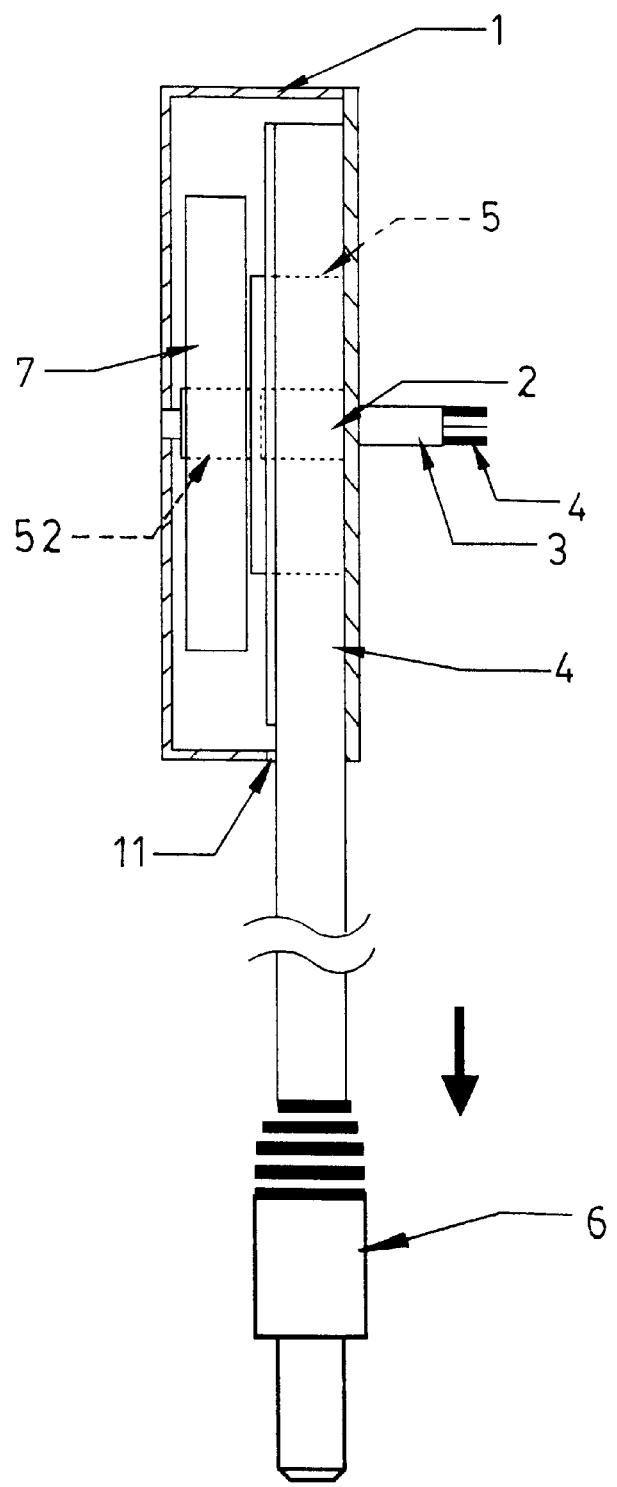
FIG. 3 is a side plan cross-sectional view of the wire receiving device without any connection point in accordance with the present invention.
Figure 4:
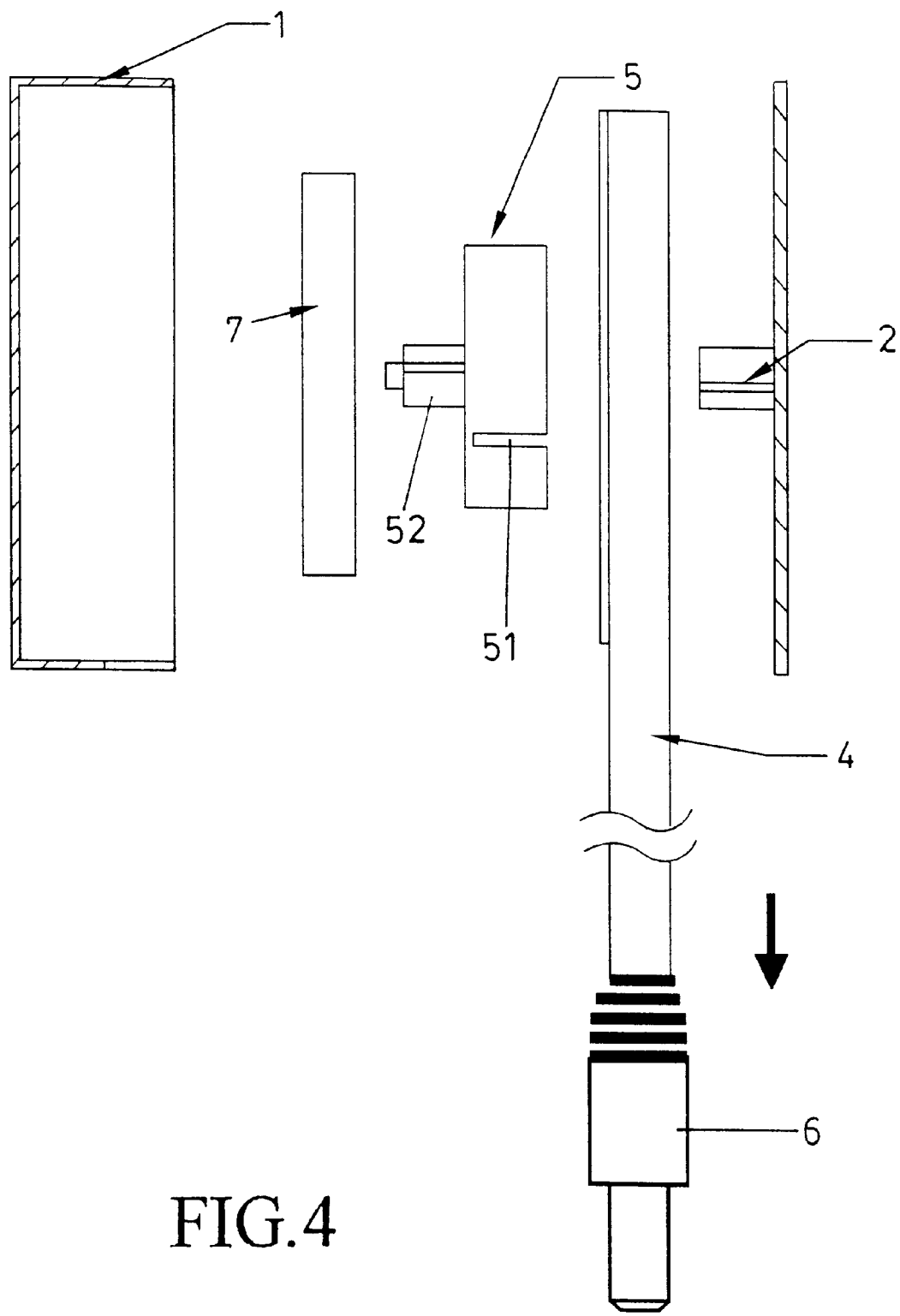
FIG. 4 is a side plan exploded view of the wire receiving device without any connection point in accordance with the present invention.

Referring now to FIGS. 1–4, the wire receiving device without any connection point in accordance with the present invention comprises a housing 1, and a fixing shaft center 2 mounted in the housing 1. The fixed shaft center 2 is connected with a wire fixing end 3. A wire 4 is fixed to the central wire fixing end 3, and is wound in the housing 1. The wire is wound around the fixing shaft center 2 along the outer periphery of the fixing shaft center 2, thereby forming the inner circle structure of the wire 4 as shown in FIG. 1. After the wire 4 is wound on the fixing shaft center 2 to reach the position of the inner circle structure, the wire 4 is passed through a breach 51 defined in one end of a mobile shaft center 5 that covers and encompasses the inner circle structure of the wire 4 as shown in FIG. 4. The wire 4 is then wound around the mobile shaft center 5 along a reverse direction to change the winding direction of the wire 4, thereby forming the outer circle structure of the wire 4. The wire 4 is then extended outward from the outlet 11 of the housing 1 and is connected to an output plug (or power plug) 6 which may be inserted into other electrical appliance, or the insertion hole of a mobile telephone (or cellular phone), or the power insertion hole of a notebook computer, for directly supplying the electric power or supplementing the electric power.

Referring to FIGS. 3 and 4, one end of the inner side of the housing 1 has a tensile spring 7 which is connected to the shaft 52 of one end of the mobile shaft center 5. When the wire 4 is pulled outward from the housing 1, a push button (not shown) may be pressed, so that the wire 4 can be rapidly wound into the housing 1 to be stored and hidden by the restoring force of the tensile spring 7. The push button is a conventional structure, and will not be further described in detail.

The fixing shaft center 2 and the mobile shaft center 5 are co-axial. Thus, as shown in FIG. 1, the circle number of the inner circle of the wire 4 is half of that of the outer circle of the wire 4. Namely, if the outer circle of the wire 4 is wound through ten circles, the inner circle of the wire 4 only needs to be wound through five circles. In comparison, the conventional wire receiving device is not divided into an inner circle and an outer circle, whereby the wire is wound in the wire receiving device along one direction only, so that the volume thereof cannot be shortened.

When the wire 4 is pulled outward from the housing 1, the outer circle of the wire 4 is pulled outward through an amount of the wire 4, while the coaxial inner circle of the wire 4 that is directed to the reverse direction may wind (or absorb) the same amount of wire 4. When the outer circle of the wire 4 is pulled outward to the limit position, and when the inner circle of the wire 4 is to be pulled outward, the inner circle of the wire 4 will increase an amount of wire 4. Accordingly, in comparison with the same wire of the conventional wire receiving device, by the design of the reverse directions of the inner circle and the outer circle of the wire 4 of the present invention, the volume of the wire receiving device of the present invention can be reduced, and the housing 1 is made to have a miniature volume without any electrical brush connection point, thereby saving the cost of fabrication.

In conclusion, in the wire receiving device without any connection point in accordance with the present invention, the inside of the housing has a coaxial structure of the fixing shaft center and the mobile shaft center, so as to divide the wire into the inner circle and the outer circle which are wound in the reverse directions, thereby previously leaving a wire winding space, reducing the volume of the housing, and saving the cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A wire receiving device comprising:

a housing, a fixed shaft center mounted in said housing, a center of said fixed shaft being connected to a wire fixing end, and a wire attached to the wire fixing end and extended into said housing where said wire is wound around said fixing shaft center, thereby forming an inner circle of wire; wherein said wire passes through an opening in an end of a coaxial mobile shaft that covers and encompasses said inner circle of wire, and said wire is wound around said mobile shaft in a direction opposite to a direction of winding of said inner circle of wire, said wire wound around said mobile shaft forming an outer circle of wire, and said wire extends outward from an outlet of said housing and is connected to an output plug or a power plug; and wherein a number of turns of said outer circle of wire is two times a number of turns of said inner circle of wire.

\* \* \* \* \*